3,222,123
PROCESS FOR PREPARING CYANOGEN HALIDES AND CARBONYL HALIDES
Roger L. Weichman and William L. Fierce, Crystal Lake, Ill., assignors, by mesne assignments, to Union Oil Company of California, Los Angeles, Calif., a corporation of California
No Drawing. Filed Mar. 28, 1962, Ser. No. 183,019
7 Claims. (Cl. 23—14)

This invention relates to new and useful improvements in the oxidation of halogenated organic compounds to produce certain halogenated products. More particularly, this invention is concerned with the catalyzed oxidation of chloroform or bromoform by nitrogen dioxide at elevated temperatures to produce carbonyl halides and cyanogen halides.

Phosgene is a poisonous gas which was manufactured on a large scale for use in gas warfare during World War I. Phosgene has acquired even more importance as an intermediate in the synthesis of many organic chemicals. In many processes, part or all of the chlorine content of the phosgene is liberated as by-product hydrogen chloride. Phosgene can be reacted with alcohols to produce dialkyl carbonates and alkyl chlorocarbonates. Phosgene is also used as an intermediate for reaction with olefins to produce unsaturated acid chlorides, and with paraffins to produce ketones and acid chlorides. The bromine-containing analogue of phosgene, carbonyl bromide, undergoes reactions which are analogous to phosgene.

Cyanogen chloride and cyanogen bromide are also well-known chemical intermediates. Cyanogen halides can be converted to cyanuric halides by heating in the presence of a suitable catalyst. Cyanuric chloride is used in the manufacture of dyes, herbicides, optical bleaches, explosives, surface-active agents, insecticides, heat-resistant plastics, and pharmaceuticals.

In our copending application Serial No. 135,138, filed August 31, 1961, we have described and claimed a process for the preparation of perhalogenated hydrocarbons, carbonyl halides, and cyanogen halides, by reaction of chloroform or bromoform with nitrogen dioxide at elevated temperatures.

One of the objects of this invention is to provide an improved method for the preparation of halogenated organic compounds such as phosgene, cyanogen chloride, and the brominated analogues thereof.

Another object of this invention is to provide an improved process for the preparation of halogenated organic intermediates from halogenated hydrocarbons.

A feature of this invention is the provision of an improved process for the preparation of phosgene, cyanogen chloride, and the brominated analogues thereof from chloroform or bromoform by reaction with nitrogen dioxide at temperatures from about 250° to about 400° C. in the presence of an activated carbon catalyst.

Other objects and features of this invention will become apparent from time to time throughout the specification and claims as hereinafter related.

This invention is based upon our discovery that the reaction of chloroform or bromoform with nitrogen dioxide at elevated temperatures, as described in our copending application Serial No. 135,138, filed August 31, 1961, can be rendered more specific for formation of cyanogen halides and carbonyl halides by carrying the reaction out in the presence of an activated carbon catalyst.

In carrying out this process, the nitrogen dioxide and chloroform or bromoform are mixed and heated (or separately heated and mixed), and passed over an activated carbon catalyst at a temperature sufficient to induce reaction. In general, the reaction takes place in the temperature range from about 250° to about 400° C. In the presence of the activated carbon catalyst, the conversion of chloroform or bromoform is quantitative. At temperatures below about 250° C., no cyanogen halide or carbonyl halide is formed in the reaction. At these temperatures, the products are principally carbon oxides and water, with chlorine and hydrogen chloride possibly present. At a temperature of about 250°–350° C., the process is almost completely selective for the formation of cyanogen halides. At temperatures above 350° C., carbonyl chloride or carbonyl bromide is formed in increasing yields while the yield of the cyanogen halide decreases. At temperatures above 400° C., the yield of cyanogen halide, which is the economically desired product, decreases rapidly and the process is therefore uneconomical at higher temperatures. The proportion of reactants is not especially critical and may range from 1 to 100 mols of nitrogen dioxide to 1 to 100 mols of chloroform or bromoform. For the preparation of a cyanogen halide, the ratio of chloroform or bromoform to nitrogen dioxide is preferably in the range from about 0.50–1.0:1. In carrying out this process, the pressure may be subatmospheric, superatmospheric, or atmospheric. If desired, an inert carrier gas, such as helium or nitrogen, can be used.

The following non-limiting examples are illustrative of the scope of this invention.

*Example I*

A vertically mounted, electrically heated reactor tube of heat-resistant, high-silica glass was charged with 25 cc. of 4–6 mesh pellets of activated carbon spaced with Berl saddles and ceramic insulating beads. The catalyst was activated by heating overnight at 110–120° C. prior to charging to the reactor. Helium, at 100 cc./min., was bubbled through chloroform at room temperature, and the resulting gas mixture was blended with gaseous nitrogen dioxide, at a rate of about 30 cc./min., and the mixture charged to the reactor tube. To evaluate the result of the reaction, samples of charge gases and product gases were analyzed by means of a mass spectrometer.

This run was carried out for a period of 30 minutes at a temperature of 195°–209° C. (200° C. at time of sampling). The gases were charged to the reactor at a gaseous hourly space velocity of 354, and a chloroform/nitrogen dioxide mol ratio of 0.67. In this run, the chloroform and nitrogen dioxide were totally consumed, but no cyanogen chloride or phosgene was formed.

*Example II*

Another run was carried out, using the apparatus and procedure described in Example I, in which certain of the reaction conditions were changed. The reaction was carried out for a period of 25 minutes at a temperature of 289°–305° C. (temperature at time of gas sampling was 305° C.). The gaseous mixture was charged to the reactor at a gaseous hourly space velocity of 356, and contained the reactants in a chloroform/nitrogen dioxide mol ratio of 0.89. In this experiment, the chloroform and nitrogen dioxide were completely consumed. Cyanogen chloride was obtained in a yield of 32.1% (and selectivity of 32.1%), while no phosgene was formed.

*Example III*

Another experiment was carried out, using the apparatus and procedure described in Examples I and II, in which the reaction conditions were further changed. The reaction was carried out for a period of 30 minutes at a temperature of 393°–410° C. (403° C. at time of gas sampling). The gaseous mixture was charged to the reactor at a gaseous hourly space velocity of 356, and contained the reactants in a chloroform/nitrogen dioxide mol ratio of 0.70. In this run, the chloroform and nitrogen dioxide were completely consumed. Cyanogen chloride was formed in a yield of 12.2% (and selectively of 12.2%), while phosgene was formed in a yield of 7.8% (and selectivity of 7.8%).

When bromoform is substituted for chloroform in the reaction as described above, a similar reaction takes place which results in the formation of the bromine-containing analogues of the products described in Examples I to III. When bromoform and nitrogen dioxide are charged in a mol ratio of 0.50–1.0:1, respectively, at a temperature of about 250°–350° C., there is a substantially complete conversion of both reactants, and cyanogen bromide is formed in substantial yield. Under these reaction conditions, cyanogen bromide is essentially the only product (other than decomposition products such as carbon, nitric oxide, water, carbon oxide, etc.). At higher temperatures, the yield of cyanogen bromide decreases and increasing amounts of carbonyl bromide are obtained. In the several runs reported above, the yields and selectivities are calculated on the assumption that 2 mols of chloroform or bromoform react with 3 mols of nitrogen dioxide to produce 2 mols of cyanogen halide, and that 1 mol each of nitrogen dioxide and chloroform or bromoform react to form 1 mol of the carbonyl halide.

From the experiments which we have carried out, we have found that our process is applicable to the oxidation of chloroform or bromoform with nitrogen dioxide in the presence of an activated carbon catalyst at temperatures in the range from about 250° to about 400° C. In this temperature range, the process is selective for the formation of cyanogen halides, or mixtures of cyanogen halides and carbonyl halides. While the catalyzed reaction of nitrogen dioxide with chloroform or bromoform is operative at temperatures above about 400° C., it is economically unfeasible since the yield of cyanogen halides decreases rapidly with increase in temperature above 400° C. The cyanogen halide is the economically attractive product of this process and thus the process is limited by economic considerations to the temperature range indicated. Where the cyanogen halide is a desired product, to the substantial exclusion of the carbonyl halide, it is preferred to carry the reaction out at a temperature of about 250°–350° C.

While we have described our invention fully and completely with special emphasis upon several preferred embodiments, we wish it to be understood that within the scope of the appended claims this invention may be practiced otherwise than as specifically described herein.

The embodiments of the invention in which an exclusive property or privilege is claimed are defined as follows:

1. A method of preparing at least one compound selected from the group consisting of CNX and $COX_2$, where X is selected from the group consisting of chlorine and bromine, which comprises heating a compound selected from the group consisting of chloroform and bromoform with nitrogen dioxide to a temperature from about 250° to about 400° C. in contact with an activated carbon-containing catalyst.

2. A method in accordance with claim 1 in which the reaction is carried out at about 300° C. and the product is principally CNX.

3. A method in accordance with claim 1 in which the ratio of reactants is 1–100 mols of the first reactant to 1–100 mols of the second reactant.

4. A method in accordance with claim 1 in which X is chlorine.

5. A method in accordance with claim 1 in which X is bromine.

6. A method in accordance with claim 4 in which the reaction is carried out using a molar excess of nitrogen dioxide at about 300° C. and the product is principally CNCl.

7. A method in accordance with claim 5 in which the reaction is carried out using a molar excess of nitrogen dioxide at about 300° C. and the product is principally CNBr.

References Cited by the Examiner
UNITED STATES PATENTS
3,052,717  9/1962  Regan _____ 260—544

OTHER REFERENCES
Gray et al.: "Chemical Reviews," volume 55, pages 1096, 1107–1110 (1955).

MAURICE A. BRINDISI, *Primary Examiner.*